United States Patent
Bieniasz-Krzywiec et al.

(10) Patent No.: US 9,235,804 B1
(45) Date of Patent: Jan. 12, 2016

(54) SYSTEM AND METHOD FOR SELECTING AND SERVING CONTENT ITEMS BASED ON SENSOR DATA FROM MOBILE DEVICES

(71) Applicant: Google Inc., Mountain View, CA (US)

(72) Inventors: Lukasz Bieniasz-Krzywiec, Sunnyvale, CA (US); Dariusz Leniowski, Mountain View, CA (US); Venu Vemula, San Ramon, CA (US)

(73) Assignee: Google Inc., Moutain View, CA (US)

( * ) Notice: Subject to any disclaimer, the term of this patent is extended or adjusted under 35 U.S.C. 154(b) by 231 days.

(21) Appl. No.: 13/797,454

(22) Filed: Mar. 12, 2013

(51) Int. Cl.
*G06N 5/02* (2006.01)

(52) U.S. Cl.
CPC ........................................ *G06N 5/02* (2013.01)

(58) Field of Classification Search
CPC .......................................................... G06N 5/02
See application file for complete search history.

(56) References Cited

U.S. PATENT DOCUMENTS

| | | | |
|---|---|---|---|
| 8,099,109 | B2 | 1/2012 | Altman et al. |
| 8,260,665 | B2 | 9/2012 | Foladare et al. |
| 2008/0195457 | A1* | 8/2008 | Sherman et al. ................ 705/10 |
| 2010/0042470 | A1* | 2/2010 | Chang et al. .................... 705/10 |
| 2010/0082652 | A1 | 4/2010 | Jones et al. |
| 2011/0166936 | A1 | 7/2011 | Dixon et al. |
| 2011/0171976 | A1 | 7/2011 | Creemer |
| 2011/0171980 | A1 | 7/2011 | Sjoberg et al. |
| 2011/0276396 | A1* | 11/2011 | Rathod ...................... 705/14.49 |
| 2011/0320259 | A1 | 12/2011 | Roumeliotis et al. |
| 2012/0041767 | A1* | 2/2012 | Hoffman et al. ................ 705/1.1 |
| 2012/0266191 | A1 | 10/2012 | Abrahamsson et al. |
| 2012/0271713 | A1 | 10/2012 | Nussel et al. |
| 2012/0303439 | A1* | 11/2012 | Flitcroft et al. ............ 705/14.36 |
| 2012/0310717 | A1 | 12/2012 | Kankainen |
| 2012/0316956 | A1 | 12/2012 | Nath et al. |
| 2013/0238544 | A1* | 9/2013 | Kunjithapatham et al. ..... 706/47 |
| 2014/0128105 | A1* | 5/2014 | Su et al. ..................... 455/456.3 |

FOREIGN PATENT DOCUMENTS

| | | |
|---|---|---|
| KR | 10-2009-0000643 A | 1/2009 |
| KR | 10-2012-0018246 A | 2/2012 |
| WO | WO 2010/005663 A1 | 1/2010 |

OTHER PUBLICATIONS

International Preliminary Report on Patentability on PCT/US2013/034686 dated Oct. 9, 2014, 12 pgs.

(Continued)

*Primary Examiner* — Alan Chen
(74) *Attorney, Agent, or Firm* — Foley & Lardner LLP; John D. Lanza (57) ABSTRACT

Sensor data having values received from several sensors of a mobile device and response data associated with the sensor data may be used in the determination or training of a predictive model. Received sensor data may be input into the predictive model, and the output of the predictive model may be used in the selection and serving of content items to the mobile device. Data to effect presentation of the selected content item may be outputted to the mobile device to effect presentation. In some instances, the predictive model may be updated using the received plurality of values. The updated predictive model may be used in the selection of a subsequent content item for the mobile device. In other implementations, historical sensor data may be used with the set of received sensor data as input for the predictive model.

8 Claims, 6 Drawing Sheets

(56) References Cited

OTHER PUBLICATIONS

International Search Report & Written Opinion on PCT/US2013/034686 dated Jul. 11, 2013, 8 pgs.

Ben Nham et al., Predicting Mode of Transport from iPhone Accelerometer Data, http://cs229.stanford.edu/proj2008/NhamSiangliulueYeung-PredictingModeOfTransportFromIphoneAccelerometerData.pdf.

\* cited by examiner

SYSTEM AND METHOD FOR SELECTING AND SERVING CONTENT ITEMS BASED ON SENSOR DATA FROM MOBILE DEVICES

BACKGROUND

In a networked environment, such as the Internet or other networks, first-party content providers can provide information for public presentation on resources, for example web pages, documents, applications, and/or other resources. The first-party content can include text, video, and/or audio information provided by the first-party content providers via, for example, a resource server for presentation on a user device over the Internet. Additional third-party content can also be provided by third-party content providers for presentation on the user device together with the first-party content provided by the first-party content providers. Thus, a person viewing a resource can access the first-party content that is the subject of the resource, as well as the third-party content that may or may not be related to the subject matter of the resource.

SUMMARY

One implementation relates to a method that may include receiving a first content item request and a first set of values that are received from a respective set of sensors of a mobile device. The set of values may indicate a first ambient condition of the mobile device. A first content item may be selected based, at least in part, on a predictive model and the first set of values. Data to effect presentation of the selected first content item may be outputted. Response data associated with the selected content item may be received and the predictive model may be updated using the received response data. A second content item request and a second set of values may be received from a respective set of sensors of the mobile device. The set of values may indicate a second ambient condition of the mobile device. A second content item may be selected based, at least in part, on the updated predictive model and the second set of values.

Another implementation relates to a system having a data processor and a storage device storing instructions that, when executed by the data processor, cause the data processor to perform several operations. The operations may include receiving a set of historical response data associated with a set of content items and a set of historical sensor data associated with the set of historical response data. The operations may further include determining a predictive model for the set of content items based, at least in part, on the set of historical response data and the set of historical sensor data. The predictive model may output a value for a content item in response to receiving a set of sensor data from a mobile device. The operations may include selecting a content item based, at least in part, on an output of the predictive model in response to receiving a set of sensor data from a mobile device. Data to effect presentation of the selected content item may be outputted.

Yet a further implementation relates to a computer-readable storage device storing instructions that, when executed by one or more data processors, cause the one or more data processors to perform several operations. The operations may include receiving a content item request, a set of sensor data, and a device identifier from a mobile device. The operations may further include receiving a set of historical sensor data associated with the device identifier from a database. The set of historical sensor data may be erased after a pre-determined period of time. A content item may be selected based, at least in part, on a predictive model. The predictive model may output a value based on the received set of sensor data and the received set of historical sensor data. Data to effect presentation of the selected content item with a resource associated with the content item request may be outputted in response to the content item request.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and embodiments of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A computing device (e.g., a user device) can view a resource, such as a web page, via the Internet by communicating with a server, such as a web page server, corresponding to that resource. The resource may include first-party content that is the subject of the resource from a first-party content provider, as well as additional third-party provided content, such as advertisements or other content. In one implementation, responsive to receiving a request to access a web page, a web page server and/or a user device can communicate with a data processing system, such as a content selection system, to request a content item to be presented with the requested web page. The content selection system can select a third-party content item and provide data to effect presentation of the content item with the requested web page on a display of the user device. In some instances, the content item may be selected and served with a resource associated with a search query response. For example, a search engine may return search results on a search results web page and may include third-party content items related to the search query in one or more content item slots of the search results web page.

The computing device (e.g., a user device) may also be used to view or execute an application, such as a mobile application. The application may include first-party content that is the subject of the application from a first-party content provider, as well as additional third-party provided content, such as advertisements or other content. In one implementation, responsive to use of the application, a web page server and/or a user device can communicate with a data processing system, such as a content selection system, to request a content item to be presented with the user interface of the application and/or otherwise. The content selection system can select a third-party content item and provide data to effect presentation of the content item with the application on a display of the user device.

In some instances, a device identifier may be associated with the user device. The device identifier may be a randomized number associated with the user device to identify the device during subsequent requests for resources and/or content items. In some instances, the device identifier may be configured to store and/or cause the user device to transmit information related to the user device to the content selection system and/or resource server (e.g., values of sensor data, a web browser type, an operating system, historical resource requests, historical content item requests, etc.).

For situations in which the systems discussed here collect information about users, or may make use of information about users, the users may be provided with an opportunity to control whether programs or features that may collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how information is collected about them and used by a content server.

A third-party content provider, when providing third-party content items for presentation with requested resources via the Internet or with an application, may utilize a content item management account to control or otherwise influence the selection and serving of the third-party content items. For instance, a third-party content provider may be able to specify keywords and corresponding bid values that are used in the selection of the third-party content items. In other implementations, the third-party content provider may be able to specify situations or states of a user device to be used in the selection and serving of third-party content items. In some instances, one or more performance metrics for the third-party content items may be determined and indications of such performance metrics may be provided to the third-party content provider via a user interface for the content item management account. For example, the performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), a conversion rate (e.g., a number of sales per impression), and/or other performance metrics may be used.

In some instances, a third-party content provider may have third-party content items that perform better based on a current state of a user device. For example, values of sensor data from user devices may be correlated with clicks or other actions associated with one or more third-party content items. It should be understood that the values of sensor data used herein does not include personally-identifiable information. Such non-personally-identifiable sensor information may include accelerations, directions of the force of gravity, rotation rates, degrees of rotation, ambient geomagnetic field values, proximity of an object relative to a device, ambient light level, ambient temperature, ambient humidity, ambient air pressure, ambient acoustic levels, and/or other non-personally-identifiable sensor information or data.

In one instance, a set of values of sensor data may be indicative of a user device having a series of accelerations and increases in ambient air pressure, such as that which occurs when riding the metro or subway. Response data, such as clicks, associated with the sensor data may be used to determine and/or update one or more predictive models. The predictive models may output a value, such as a predicted CTR (pCTR), a predicted CVR (pCVR), etc., for content items based, at least in part, on received sensor data. The value may be used, at least in part, in the selection of a content item to be served to the user device.

The predictive model may be determined based on past sensor data and associated response data from the user device and/or other user devices. That is, a predictive model may be trained using past sensor data of user devices for which a content item was selected and served and, for example, whether the served content item was clicked or selected. In some implementations, the predictive model may be determined using machine learning algorithms and/or other methods for determining the predictive model using the sensor data. When sensor data is received from a user device (e.g., as part of a content item request, associated with a content item request, etc.), the sensor data may be used as an input for the predictive model and the outputted value (e.g., pCTR, pCVR, etc.) for a content item may be used in the selection of a content item from several content items. Thus, the sensor data received from a user device may be used in the selection and serving of a content item.

In another example, the past sensor data of a user device may be used in the selection and serving of a content item. For example, a user may permit the sensor data of their user device to be temporarily stored for a predetermined period of time (e.g., sensor data for the past minute, past 5 minutes, past 10 minutes, past 30 minutes, past hours, past 2 hours, past 4 hours, past 6 hours, past 12 hours, past 24 hours, etc.). The sensor data may be periodically received by a content selection system and/or sent by the user device (such as in response to a request from the content selection system or independently) and temporarily stored in a device state history or otherwise in a database of the content selection system. In some instances, the sensor data may be stored chronologically, such as in a time series. Once the predetermined period of time has elapsed, such sensor data from the device state history may be deleted, overwritten, and/or otherwise removed from the database such that the sensor data for which the predetermined period has elapsed is no longer available.

When a request for a content item is received, the sensor data stored in the device state history may be utilized in the selection of a content item in addition to, or in lieu of, the current sensor data. For instance, all the sets of sensor data from the device state history and/or a subset of the sets of sensor data from the device state history may be used as an input for the predictive model. By way of example, if sensor data is stored for the past 5 minutes in 1 minute intervals, the 5 sets of sensor data stored in the device state history or otherwise in the database may be used as input for the predictive model, either as a single input or a series of inputs. The output value or values of the predictive model may be used in the selection of a content item, such as selecting content item with the highest output from the predictive model and/or using outputs from the predictive model as part of another selection process (e.g., as part of a content item auction and/or otherwise).

In some implementations, repetitive sensor data (e.g., sensor data that is similar due to repeated events, such as riding the metro or subway) may be determined from the device state history and utilized as input for the predictive model. That is, if values of the sensor data in the device state history recurs (such as a series of sets of values of sensor data having high values for accelerations and ambient air pressure), the recurring sensor data may be utilized as the input for the predictive model. Thus, the output of the predictive model may be utilized in the selection and serving of a content item for which the recurring sensor data is most relevant. For example, for sets of sensor data that indicate a mobile device is used while jogging, the output of the predictive model may be used to select a content item associated with jogging, even if the current sensor data does not have values indicating the ambient condition of jogging.

In some instances, predictive models may be generated and used for each third-party content item. In other instances, predictive models may be generated for groups or categories of third-party content items (e.g., content items related to running, movies, etc., sets of content items of a third-party content provider, and/or otherwise).

While the foregoing has provided an overview of a predictive model in the selection of content items based on several values for sensor data from a user device, more specific examples and systems to implement such a predictive model will now be described herein.

Figure 1:
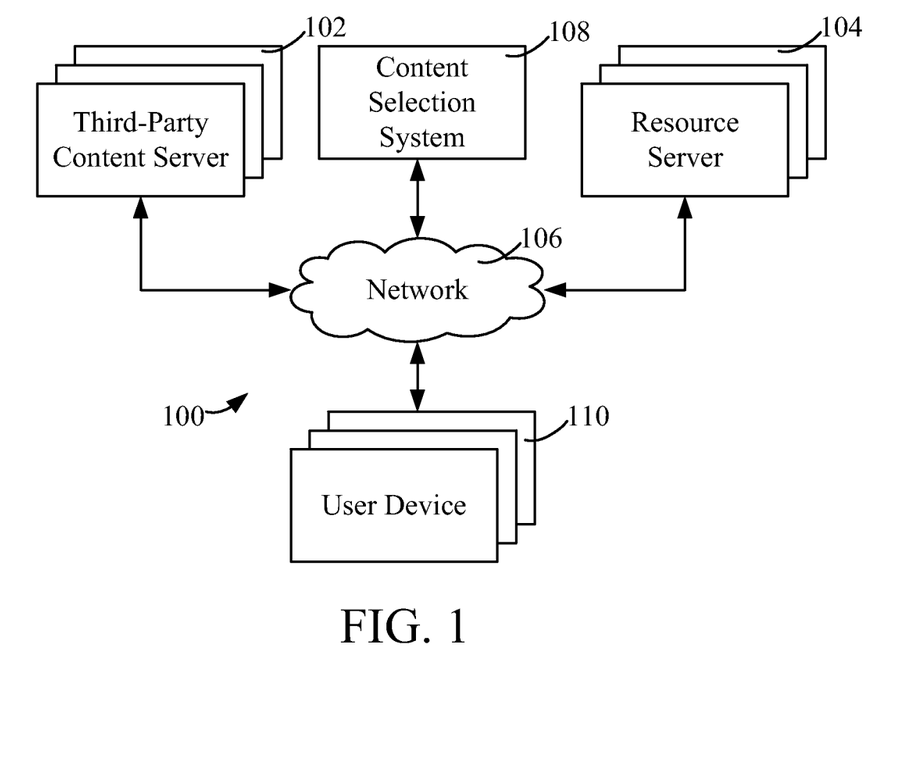
FIG. 1 is an overview depicting an example system of providing information via a computer network.

FIG. 1 is a block diagram of an example system 100 for providing information via at least one computer network such as the network 106. The network 106 can include computer networks such as the Internet, local, wide, metro or other area networks, intranets, and other computer networks such as voice or data mobile phone communication networks. The system 100 can also include at least one data processing system, such as a content selection system 108. The content selection system 108 can include at least one logic device such as a computing device having a data processor to communicate via the network 106, for example with a resource server 104, a user device 110, and/or a third-party content server 102. The content selection system 108 can include one or more data processors, such as a content placement processor configured to process information and provide data to effect presentation of one or more content items to the resource server 104 or the user device 110, and one or more databases configured to store data. The content selection system 108 can include a server, such as an advertisement server or otherwise.

The user device 110 can include one or more mobile computing devices such as a laptop, smart phone, tablet, and/or personal digital assistant device configured to communicate with other devices via the network 106. The computing device may be any form of portable electronic device that includes a data processor and a memory, i.e., a processing module. The processor may include a microprocessor, an application-specific integrated circuit (ASIC), a field-programmable gate array (FPGA), etc., or combinations thereof. The memory may store machine instructions that, when executed by a processor, cause the processor to perform one or more of the operations described herein. The memory may also store data to effect presentation of one or more resources, content items, etc. on the computing device. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, solid state drive, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, ActionScript®, JavaScript®, JSON, Perl®, HTML, HTML5, XML, Python®, and Visual Basic®. The user device 110 can execute a software application (e.g., a web browser or other application) to retrieve content from other computing devices over network 106.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, application data, and other forms of electronic documents or data) to the user device 110. In one implementation, the user device 110 can access the resource server 104 via the network 106 to request data to effect presentation of a resource of the resource server 104.

One or more third-party content providers may have third-party content servers 102 to directly, indirectly, or otherwise provide data for third-party content items to the content selection system 108 and/or to other computing devices via network 106. The content items may be in any format that may be presented on a display of a user device 110, for example, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the third-party content servers 102 may be integrated into the content selection system 108 and/or the data for the third-party content items may be stored in a database of the content selection system 108.

In one implementation, the content selection system 108 can receive, via the network 106, a request for a content item to present with a resource and/or an application (such as a mobile application). The received request may be received from a resource server 104, a user device 110 (e.g., a mobile device executing a mobile application, etc.), and/or any other computing device. The resource server 104 may be owned or ran by a first-party content provider that may have an agreement with the owner of the content selection system 108 for the system to provide third-party content items to present with one or more resources of the first-party content provider on the resource server 104. In one implementation, the resource may include a web page. In another example, an application may be developed by a first-party content provider that may have an agreement with the owner of the content selection system 108 for the system to provide third-party content items to present with the application of the first-party content provider.

The user device 110 may be a computing device operated by a user (represented by a device identifier), which, when accessing a resource of the resource server 104 and/or executing an application, can make a request to the content selection system 108 for content items to be presented with the resource and/or application, for instance. The content item request can include requesting device information (e.g., a web browser type, an operating system type, one or more previous resource requests from the requesting device, one or more previous content items received by the requesting device, a language setting for the requesting device, a time of a day at the requesting device, a day of a week at the requesting device, a day of a month at the requesting device, a day of a year at the requesting device, etc.) and resource and/or application information (e.g., a uniform resource locator (URL) of the requested resource, one or more keywords of the content of the requested resource, text of the content of the resource, a title of the resource, one or more keywords of the content of the application, text of the content of the application, a title of the application, etc.). The device information that the content selection system 108 receives can include a HyperText Transfer Protocol (HTTP) cookie which contains a device identifier (e.g., a random number, alphanumeric string, etc.) that represents the user device 110.

In some instances, sensor data from the user device 110 may also be included, either as part of the content item request and/or separately. For example, a resource from the resource server 104 may include coding, such as HTML5, JavaScript®, etc., that requests sensor data from one or more sensors of the user device and returns the sensor data to the content selection system 108. In some instances, the sensor data may be incorporated into the content item request with the device information and/or resource information (such as appending a string of encoded sensor data to a URL request) or the sensor data may be transmitted to the content selection system 108 separately. The requesting device information, the resource information, and/or the sensor data may be utilized by the content selection system 108 to select third-party content items to be served with the requested resource and presented on a display of a user device.

A resource may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a user device 110. The search results may include web page titles, hyperlinks, etc. One or more third-party content items may also be presented with the search results in a content item slot of the search result web page. Accordingly, the resource server 104 and/or the user device 110 may request one or more content items from the content selection system 108 to be presented in the content item slot of the search result web page. The content item request may include additional information, such as a quantity of content items, a format for the content items, the search query string, keywords of the search query string, information related to the query (e.g., temporal information), etc. In some implementations, a delineation may be made between the search results and the third-party content items to avert confusion. The resource server 104 and/or user device 110 may transmit information regarding the selected content item to the content selection system 108, such as data indicating whether the content item was clicked on.

In some implementations, the third-party content provider may manage the selection and serving of content items by content selection system 108. For example, the third-party content provider may set selection criteria via a user interface that may include one or more content item conditions or constraints regarding the serving of content items. A third-party content provider may specify that a content item and/or a set of content items should be selected and served for user devices 110 having device identifiers associated with a certain language, a certain operating system, a certain web browser, etc. In another example, the third-party content provider may specify that a content item or set of content items should be selected and served when the resource, such as a web page, document, etc., contains content that matches or is related to certain keywords, phrases, etc. In other instances, the third-party content provider may specify that a content item or set of content items should be selected and served when particular sets of values for sensor data is received. Of course the third-party content provider may include other selection criteria as well.

Figure 2:
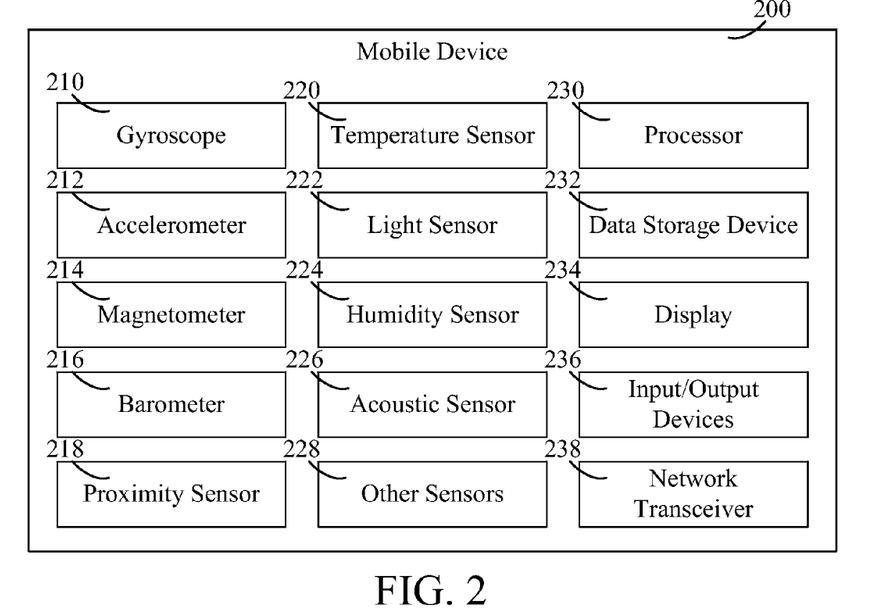
FIG. 2 is a block diagram of an example mobile device having several sensors.

FIG. 2 is a block diagram of an example mobile device 200, which may be a user device 110 of FIG. 1, having several sensors, a processor 230, a data storage device 232, a display 234, input/output devices 236, and a network transceiver 238. The mobile device 200 may include a smartphone, a cellular telephone, a tablet, a laptop, a portable media device, a wearable display or glasses, and/or any other portable electronic device. The mobile device 200 may include a bus or other communication component for communicating information between the various components of the mobile device 200. The processor 230 or processor may be coupled to the bus and/or otherwise for processing information, data, and/or instructions from one or more components of the mobile device 200. The data storage device 232 may include dynamic storage devices, such as a RAM or other dynamic storage devices, and may be coupled to the bus and/or otherwise for storing information, data, and/or instructions to be executed by the processor 230. The data storage device 232 can also be used for storing position information, temporary variables, and/or other intermediate information during execution of instructions by the processor 230. In some instances, the data storage device 232 may include a static storage device, in addition to or instead of the dynamic storage device, such as ROM, solid state drive (SSD), flash memory (e.g., EEPROM, EPROM, etc.), magnetic disc, optical disc, etc., that is coupled to the bus and/or otherwise for storing static information, data, and/or instructions for the processor 230.

The display 234 may be coupled via the bus and/or otherwise to other components of the mobile device 200. The display may include a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. The input/output devices 236 may include devices such as a keyboard having alphanumeric and other keys, a microphone, a speaker, an LED, a trackball, a mouse, cursor direction keys, etc. that may be coupled to the bus for communicating information and/or command selections to the processor 230. In another implementation, an input device may be integrated with the display 234, such as in a touch screen display.

The network transceiver 238 may be configured to interface with a network, such as network 106 of FIG. 1. Example of such a network may include the Internet, local, wide, metro or other area networks, intranets, voice or data mobile device communication networks, and/or other networks. In one example, the network transceiver 238 may include voice and/or data mobile device communication network through which the mobile device 200 may communicate with remote devices, such as third-party content server 120, resource server 104, and/or content selection system 108 of FIG. 1. The voice and/or data mobile device communication network may include those operating under the standards of GSM, EDGE, GPRS, CDMA, UMTS, WCDMA, HSPA, HSPA+, LTE, and/or other mobile device network standards. In some implementations, the network transceiver 238 may include other network transceivers, such as a WiFi™ transceiver, a Bluetooth® transceiver, a cellular transceiver, an NFC transceiver, etc. In still further implementations, the mobile device 200 may include several network transceivers 238, such that the mobile device 200 may communicate with several networks. Of course, other network transceivers 238 for the mobile device 200 to communicate with remote devices may be used as well.

According to various implementations, the processor 230 may execute an arrangement of instructions contained in the data storage device 232. Such instructions can be read into the data storage device 232 from another computer-readable medium. Execution of the arrangement of instructions contained in the data storage device 232 may cause the mobile device 200 to perform various operations, such as reading data output from one or more sensors, transmitting data to a remote device via the network transceiver 238, displaying information on the display 234, and/or otherwise. One or more processors in a multi-processing arrangement may also be employed to execute the instructions contained in the data storage device 232. In alternative implementations, hardwired circuitry may be used in place of or in combination with software instructions to effect the various operations. Thus, implementations are not limited to any specific combination of hardware circuitry and software. Of course, other configurations or components for mobile device 200 may be included.

The several sensors may include a gyroscope 210, an accelerometer 212, a magnetometer 214, a barometer 216, a proximity sensor 218, a temperature sensor 220, a light sensor 222, a humidity sensor 224, an acoustic sensor 226, and/or other sensors 228. Of course mobile device 200 may have other features, components, etc. as well.

In the present example, gyroscope 210 may be communicatively coupled to the processor 230, the data storage device 232, the display 234, the input/output devices 236, the network transceiver 238, and/or other components of the mobile device 200. The gyroscope 210 may include a microelectromechanical system (MEMS) gyroscope, a vibrating structure gyroscope (VSG) (e.g., a tuning fork gyroscope), and/or any other gyroscope. The gyroscope 210 may be configured measure the rate of rotation of the mobile device 200 about one, two, and/or three axes and/or the degrees of rotation relative to one, two, and/or three axes. The values of the rates of rotation and/or the values of the degrees of rotation may be output to the processor 230, the data storage device 232, the network transceiver 238, and/or any other component of the mobile device 200.

The accelerometer 212 may be communicatively coupled to the processor 230, the data storage device 232, the display 234, the input/output devices 236, the network transceiver 238, and/or other components of the mobile device 200. The accelerometer 212 may include a MEMS accelerometer, a piezoelectric accelerometer, and/or any other accelerometer. The accelerometer 212 may be configured measure the acceleration of the mobile device 200 in one, two, and/or three axes and/or the direction of gravity relative to one, two, and/or three axes. The values of the accelerations and/or the values of the force of gravity for the one, two, and/or three axes may be output to the processor 230, the data storage device 232, the network transceiver 238, and/or any other component of the mobile device 200.

The magnetometer 214 may be communicatively coupled to the processor 230, the data storage device 232, the display 234, the input/output devices 236, the network transceiver 238, and/or other components of the mobile device 200. The magnetometer 214 may include a magnetoresistive sensor and/or any other magnetometer. The magnetometer 214 may be configured measure the ambient geomagnetic field relative to the mobile device 200 in one, two, and/or three axes. The values of the ambient geomagnetic fields for the one, two, and/or three axes may be output to the processor 230, the data storage device 232, the network transceiver 238, and/or any other component of mobile device 200.

The barometer 216 may be communicatively coupled to the processor 230, the data storage device 232, the display 234, the input/output devices 236, the network transceiver 238, and/or other components of the mobile device 200. The barometer 216 may include a digital barometer, an aneroid barometer, and/or any other barometer. The barometer 216 may be configured measure the air pressure around the mobile device 200. The value of the air pressure may be output to the processor 230, the data storage device 232, the network transceiver 238, and/or any other component of mobile device 200.

The proximity sensor 218 may be communicatively coupled to the processor 230, the data storage device 232, the display 234, the input/output devices 236, the network transceiver 238, and/or other components of the mobile device 200. The proximity sensor 218 may include a reflective proximity sensor, an ultrasonic proximity sensor, and/or any other proximity sensor. The proximity sensor 218 may be configured measure the proximity of an object relative to the mobile device 200. The value of the proximity of the object may be output to the processor 230, the data storage device 232, the network transceiver 238, and/or any other component of mobile device 200.

The temperature sensor 220 may be communicatively coupled to the processor 230, the data storage device 232, the display 234, the input/output devices 236, the network transceiver 238, and/or other components of the mobile device 200. The temperature sensor 220 may include a thermistor, a thermocouple, a silicon bandgap temperature sensor, an infrared thermometer, and/or any other temperature sensor. The temperature sensor 220 may be configured measure the ambient temperature around the mobile device 200. The value of the temperature may be output to the processor 230, the data storage device 232, the network transceiver 238, and/or any other component of mobile device 200.

The light sensor 222 may be communicatively coupled to the processor 230, the data storage device 232, the display 234, the input/output devices 236, the network transceiver 238, and/or other components of the mobile device 200. The light sensor 222 may include a charge-coupled device (CCD), a photodiode, a photovoltaic cell, and/or any other photodetector or light sensor. The light sensor 222 may be configured measure the ambient light level around the mobile device 200. The value of the light level may be output to the processor 230, the data storage device 232, the network transceiver 238, and/or any other component of mobile device 200.

The humidity sensor 224 may be communicatively coupled to the processor 230, the data storage device 232, the display 234, the input/output devices 236, the network transceiver 238, and/or other components of the mobile device 200. The humidity sensor 224 may include a humistor, a capacitive humidity sensor, a thermal conductivity humidity sensor, and/or any other humidity sensor. The humidity sensor 224 may be configured measure the ambient humidity level around the mobile device 200. The value of the humidity level may be output to the processor 230, the data storage device 232, the network transceiver 238, and/or any other component of mobile device 200.

The acoustic sensor 226 may be communicatively coupled to the processor 230, the data storage device 232, the display 234, the input/output devices 236, the network transceiver 238, and/or other components of the mobile device 200. The acoustic sensor 226 may include a MEMS microphone, a fiber optic microphone, and/or any other acoustic sensor. The acoustic sensor 226 may be configured measure the ambient acoustic level around the mobile device 200. The value of the acoustic level may be output to the processor 230, the data storage device 232, the network transceiver 238, and/or any other component of mobile device 200.

While the foregoing has describes some examples of sensors that may be included in a mobile device 200, still other sensors 228 may be included as well, such as atmospheric sensors, fluid velocity sensors, force sensors, etc.

In some implementations, the values from the several sensors may be read and transmitted via the network transceiver 238 in response to receiving data via the network transceiver 238. For example, a mobile device 200 may request a resource, such as a mobile webpage, by sending the request for data for the resource to a resource server, such as resource server 104, via the network transceiver 238. The resource server may receive the request and transmit data to effect presentation of the resource on the display 234 of the mobile device 200. The data for the resource may include one or more content item slots for displaying one or more third-party content items when the resource is presented for display by the mobile device 200. In some implementations, the data for the requested resource may include code or piece of code, such as a JavaScript® script, that may cause the processor 230 of the mobile device 200 to read one or more values from one or more sensors of the mobile device 200 and transmit the one or more values to a remote device, such as content selection system 108, via the network transceiver 238. By way of example, the one or more values from the one or more sensors of the mobile device 200 may be appended to a content item request URL (e.g., http://contentitem.item/page/contentitem?party=abc123&sensor1=5&sensor2=7&sensor3=45 or http://contentitem.item/page/contentitem?party=abc123&devicestate=98765). Thus, one or more of the several sensors of the mobile device 200 may have the current values read and transmitted to a content selection system. Such values may be used by the content selection system to select a content item to be served with the requested resource. In some instances, the code may repeatedly cause the processor 230 of the mobile device 200 to read and transmit the values of one or more sensors to select and serve several third-party content items. The code may include instructions to read and transmit the values after a predetermined period of time (e.g., every 30 seconds, every 1 minute, every 2 minutes, every 5 minutes, etc.), after the occurrence of an event, and/or on demand.

In another implementation, the values from the several sensors may be read and transmitted via the network transceiver 238 in response to executing a mobile application on the mobile device 200. For example, a mobile application may include a content item slot for presenting third-party content items while the mobile application is being executed. The mobile application may include instructions that cause the processor 230 of the mobile device 200 to read the values of one or more sensors and transmit the values of the one or more sensors to a remote device, such as content selection system 108, via the network transceiver 238. By way of example, the one or more values from the one or more sensors of the mobile device 200 may be appended to a content item request URL (e.g., http://contentitem.item/page/contentitem?party=abc123&sensor1=5&sensor2=7&sensor3=45 or http://contentitem.item/page/contentitem?party=abc123&devicestate=98765). Such values may be used by the content selection system to select a content item to be served while the mobile application is executing on the mobile device 200. In some instances, the mobile application may repeatedly cause the processor 230 of the mobile device 200 to read and transmit the values of one or more sensors to select and serve several third-party content items. The mobile application may include instructions to read and transmit the values after a predetermined period of time (e.g., every 30 seconds, every 1 minute, every 2 minutes, every 5 minutes, etc.), after the occurrence of an event, and/or on demand.

In other instances, the values from the several sensors may be read and stored in the data storage device 232. The values may be individually stored or stored as a set, such as in a log for a device state. The stored values or set of values may be transmitted to a remote device via the network transceiver 238. When a content item request is to be transmitted, such as in response to executing code of a mobile webpage and/or in response to instructions from an executed mobile application, the stored set of values may be transmitted via the network transceiver 238 to a content selection system, such as content selection system 108 of FIG. 1, as part of or with a content item request sent to the content selection system. The stored values or set of values of the one or more sensors may be periodically read, stored, and/or transmitted for successive predetermined periods of time, such as for subsequent content item requests.

In another example, several sets of values may be stored in the data storage device 232 and may all be transmitted, or a subset may be transmitted, via the network transceiver 238 as part of or with a content item request sent to the content selection system. In some instances, the several sets of values may be stored in the data storage device 232 for a predetermined period of time and deleted, erased, overwritten, or otherwise disposed of after the predetermined period of time (e.g., sets of values may read and stored every 1 minute for a 5 minute period, when the 6th minute elapses, the first set of values may be overwritten with the set of values from the 6th minute). In other examples, the set of values may not be stored, but may be read and transmitted when a content item request is sent.

In some implementations, the code, such as a JavaScript® script, may be included or embedded as part of a selected and served content item. Such code may be used to receive values for sensor data and response data to determine one or more predictive models. Accordingly, the code may be included in a selected and served content item, that, when executed by the mobile device 200, will read and transmit the values from the one or more sensors via the network transceiver 238 to a remote device, such as the content selection system 108 of FIG. 1. In addition, the code may return response data indicative of whether the content item was selected (such as for CTR calculation), whether a conversion occurred (such as for CVR calculation), and/or other performance metrics. Thus, the code included with the selected and served content item may be used to collect sets of values for sensor data and response data for content items that are selected and served. The sets of values for sensor data and response data may be used to generate and/or update one or more predictive models, as will be described in greater detail below.

Figure 3:
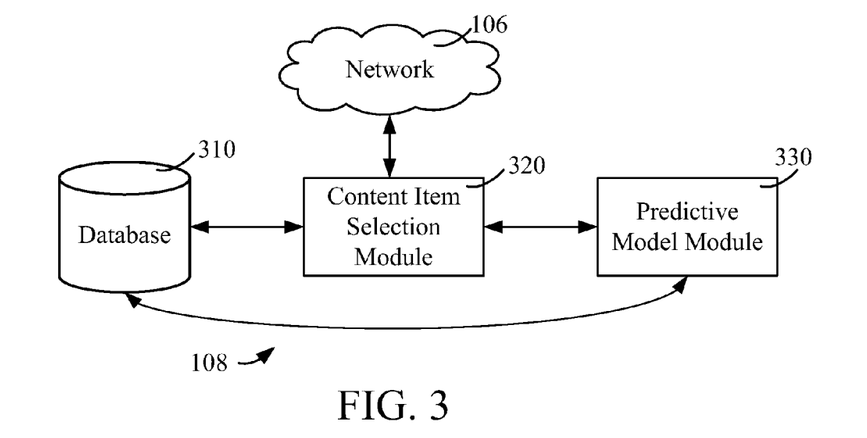
FIG. 3 is a block diagram of an example of a system for selecting content items using a predictive model.

FIG. 3 is a block diagram of an example portion of the content selection system 108 for selecting and serving content items. In the present example, the content selection system 108 may include a database 310, a content item selection module 320, and a predictive model module 330. The database 310 may store data for and/or provide data to the content item selection module 320 and/or the predictive model module 330. The database 310 may include a static storage device, such as ROM, solid state drive (SSD), flash memory (e.g., EEPROM, EPROM, etc.), magnetic disc, optical disc, etc., a plurality of static storage devices, a cloud storage system, a server, and/or any other electronic device capable of storing and providing data. The data stored in the database 310 may include data to effect presentation of the content item, CTR values, CVR values, sensor data from one or more sensors and/or from one or more mobile devices, historical sensor data, sequences of served content items, impression counts, content item slot positions, numbers of content items in a content item slot, winning bids, selection criteria, format types, keywords, languages, times of a day, days of a week, days of a month, days of a year, and/or any other data.

In some instances, the data may be related to a parameter of a selected and served content item. For example, data for content item slot positions may be related to what positions in a content item slot a particular content item has been shown. Such data may be used to filter response data across a number of content items such that the content item slot position is the same for the response data for each content item. Accordingly, the response data used to determine a predictive model, as will be described below, may filter out aspects that may affect the response data. For example, a content item shown in a top position of a content item slot may be selected more often than a content item shown in a lower position of a content item slot. Accordingly, the response data may be filtered such that a first response for a content item shown in the top position may be used with other responses for the content item shown in the top position.

In the present example, database 310 includes one or more values of sensor data from one or more sensors and/or from one or more mobile devices. In some instances, the values of sensor data for a mobile device may be stored as a set of values. The sensor data for a mobile device may include values received from one or more of a gyroscope, accelerometer, magnetometer, barometer, proximity sensor, temperature sensor, light sensor, humidity sensor, acoustic sensor, and/or any other sensor of a mobile device, such as mobile device 200. The sensor data may be representative of a device state or ambient condition when the sensor data is taken.

In some instances, the sensor data may be associated with data indicating whether a content item has been clicked on or not, such as response data. The response data may be any form of response data that may be useful for determining a predictive model. For example, the response data may be data indicating whether a content item was clicked (e.g, a 1 if the content item was clicked and a 0 if not), whether a conversion occurred (e.g., a 1 if the selection and serving of the content item resulted in a sale and a 0 if not), etc. Thus, the database 310 may include a set of values of sensor data and a set of response data associated with the set of values of sensor data. As will be discussed in greater detail below, such response data and sets of values of sensor data may be used in determining and/or using a predictive model.

The content item selection module 320 may be in communication with the network 106 and may be configured to select one or more content items to be served with a resource and/or an application. In some instances, the content item selection module 320 may perform an auction to select the one or more content items. For example, the content item selection module 320 may select one or more content items of one or more third-party content providers based, at least in part, on output from the predictive model module 230. The selection of the one or more content items may be further based on a bid of one or more third-party content providers for the one or more content items. Although the predictive model module 330 is shown separate from the content item selection module 320, in some implementations, the predictive model module 330 may be part of the content item selection module 320.

As will be described in greater detail below, the predictive model module 330 may output one or more values that may be used by the content item selection module 320 to select a content item based on a predictive model. For instance, the predictive model may be generated and/or updated using historical sensor data associated with historical response data, which may be stored in database 310. Such a predictive model may be trained via machine learning algorithms. The predictive model may output a predicted response data value (e.g., pCTR, pCVR, etc.) when provided with values of sensor data as an input to the predictive model. For instance, a particular content item may have a higher historical CTR value when values of sensor data indicates a series of accelerations and increases in ambient air pressure (e.g., a content item related to a metro or subway may be clicked on more often when sensor data indicates that a mobile device is currently on the metro or subway and/or has historically been on the metro or subway). The predictive model may be generated and/or updated based on a number of historical sensor data sets and historical response data (e.g., whether the content item was clicked on) to provide an output value indicating that the content item has a higher predicted CTR value when subsequent sensor data from a mobile device indicates a series of accelerations and increases in ambient air pressure. Of course other implementations and/or outputs using the predictive model may be provided.

Figure 4:
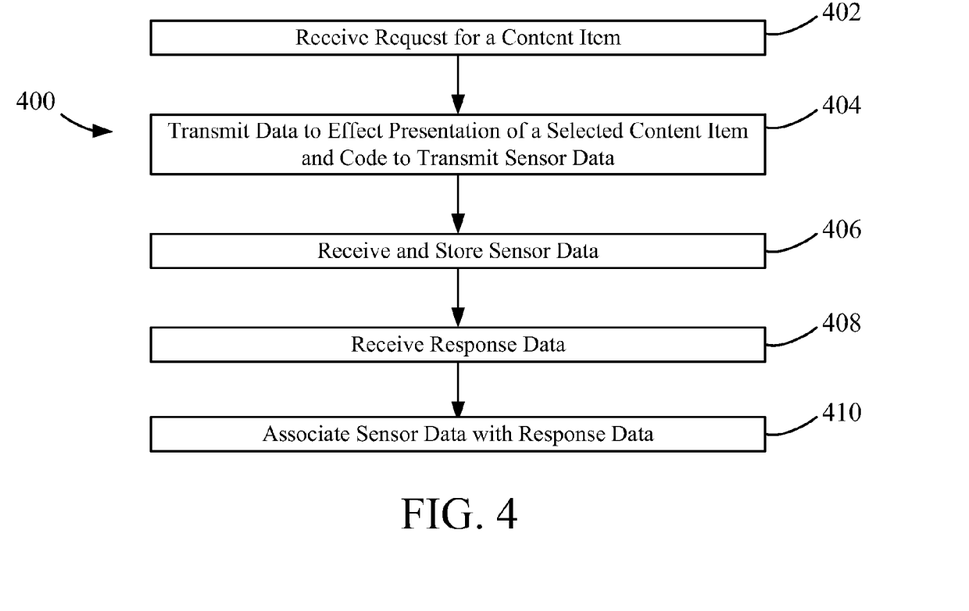
FIG. 4 is a flow diagram of an example method for aggregating values of sensor data from one or more mobile devices.

FIG. 4 is a flow diagram of an example method 400 for aggregating values of sensor data from one or more mobile devices. A request for a content item may be received (block 402) by a content selection system, such as content selection system 108 of FIG. 1. The content item request may be received from a resource server, a mobile device, a user device, and/or otherwise. The request for a content item may include parameters such as a search query string, a keyword, a language, a time of a day, a day of a week, a day of a month, a day of a year, a resource domain, a browser type, an operating system type, a content item slot position, a number of content items to be presented in a content item slot, and/or any other parameter that may be associated with a request for a content item. Such parameters may be used in the selection and serving of a content item by the content selection system.

Data to effect presentation of a selected content item and code to transmit sensor data may be transmitted (block 404) in response to the request for a content item. As noted above, in some implementations, code, such as a JavaScript® script, may be included or embedded as part of a selected and served content item. In other implementations, the script may be sent separately from the data to effect presentation of the content item. Such code may be used to read and transmit values for sensor data and response data when a content item is selected and served to a mobile device. For an example mobile device, the data to effect presentation of the selected content item and the code may be transmitted via a voice and/or data mobile device communication network operating under the standards of GSM, EDGE, GPRS, CDMA, UMTS, WCDMA, HSPA, HSPA+, LTE, and/or other mobile device network standards. In some implementations, the data to effect presentation of the selected content item and the code may be transmitted via WiFi™, Bluetooth®, NFC, and/or otherwise.

Sensor data may be received and stored by the content selection system (block 406). When the code transmitted with the selected and served content item is executed by a mobile device, the output of one or more sensors of the mobile device may be read and transmitted to the content selection system. For example, values for an accelerometer and a gyroscope for the three axes of the mobile device may be read and transmitted when the code is executed by a processor of the mobile device. The set of values of sensor data may be transmitted as separate discrete values or as a set of values (e.g., an array, an encoded string value, etc.). The received set of values of sensor data may be stored, such as in the database 310 of FIG. 3.

Response data may also be received by the content selection system (block 408). For example, the code transmitted with the selected and served content item may be used to determine whether the served content item is selected, whether a conversion occurs, and/or when any other event is performed. For example, a JavaScript® script may transmit a first value, e.g., a 1, if the served content item is selected by a user of the mobile device and a second value, e.g., a 0, if the served content item is not selected. The script may determine that the content item is not selected if a predetermined period of time elapses without a selection and/or if the content item is no long displayed (e.g., by a user navigating away from a webpage, by terminating the execution of an application, etc.). The script may transmit the response data to the content selection system by causing a processor of the mobile device to transmit the response data via a network transceiver.

The received set of values of sensor data may be associated with the received response data (block 410), such as by the content selection system. For example, the received set of values of sensor data and the received response data may be stored together and associated in a device state history, a log, and/or other data file in a database and/or otherwise. In some implementations, the received set of values of sensor data and the received response data may be further associated with the served content item (e.g., by an identifier of the served content item or otherwise), with a category or group of the served content item (e.g., by an identifier of a category or group of the served content item or otherwise), with similar sets of sensor data having similar values of other mobile devices (e.g., by an identifier for an aggregate grouping of similar sensor data), and/or with otherwise. The received set of values of sensor data and the received response data may be used in the determining of a predictive model.

In some instances, the sensor data may be bucketized (e.g., utilizing a value representative of a range of discrete values). For example, the values of degrees of rotation about an axis may be bucketized into less then 45 degrees, between 45 and 90 degrees, inclusive, between 90 and 135 degrees, inclusive, between 135 and 180 degrees, less then −45 degrees, between −45 and −90 degrees, inclusive, between −90 and −135 degrees, inclusive, and between −135 and −180 degrees, inclusive. Of course the foregoing is merely an example and other ranges may be used and/or other levels of abstraction may be implemented (e.g., vertical orientation, horizontal orientation, tilted, etc.). Moreover, in some instances, machine learning algorithms may be used to determine the ranges for the various sensor data for abstraction. For example, it may be determined that accelerations over 15 meters per second may not occur very often. Accordingly, an end range or bucket for acceleration may be determined for sensor data for accelerations greater than 15 meters per second. Smaller range buckets may be determined to differentiate smaller accelerations, such as buckets for acceleration values of exactly 0, between 0 and 0.1, inclusive, between 0.1 and 0.5, inclusive, between 0.5 and 0.75, inclusive, etc. In still further implementations, a user of a mobile device may indicate the ambient condition that occurred when the sensor data was taken (e.g., via an application or otherwise). For example, a set of sensor data may be read and transmitted and the user may indicate an ambient condition corresponding to the data, such as "running," "jogging," "driving," etc. Accordingly, such tagged sensor data having values may be associated with other similar sensor data. In addition, subsequent sets of sensor data may be categorized as belonging to one of the high level abstractions or ambient conditions and the high level abstraction or ambient condition may be used as an input into the predictive model in the selection and serving of a content item.

Figure 5:
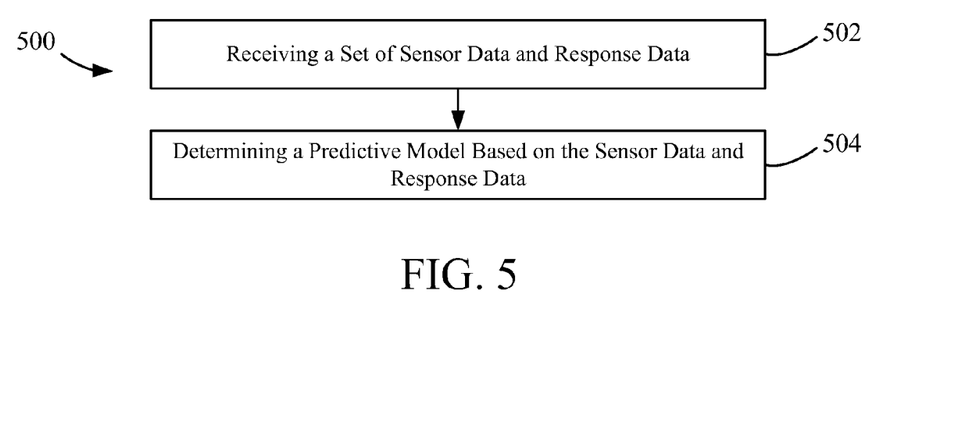
FIG. 5 is a flow diagram of an example method for training a predictive model.

FIG. 5 is a flow diagram of an example method 500 for determining a predictive model to output a value based on sensor data. The method 500 may include receiving a set of sensor data and associated response data (block 502). The response data may be any form of response data that may be useful for determining a predictive model. For example, the response data may be data indicating whether a content item was clicked (e.g, a 1 if the content item was clicked and a 0 if not), whether a conversion occurred (e.g., a 1 if the selection and serving of the content item resulted in a sale and a 0 if not), etc.

The set of sensor data may include several sets of sensor data received from several different mobile devices. The sets of sensor data may each include a set of values representing values outputted from sensors from the respective mobile devices. For example, the set of values may include those outputted by a gyroscope, an accelerometer, a magnetometer, a barometer, a proximity sensor, a temperature sensor, a light sensor, a humidity sensor, an acoustic sensor, and/or other sensors. In some instances, the values may be bucketized values, high level abstractions or ambient conditions, and/or otherwise as described above. In some implementations, the received set of sensor data and the response data may be associated with a content item of a set of content items.

Using the set of sensor data and the response data, a predictive model may be determined (block 504). For example, CTR values, as determined by the response data, for a certain content item may be determined to be lower when certain values of sensor data are present while CTR values for the same content item may be higher when other values of sensor data are present. Thus, the determined predictive model may output a higher predicted CTR value when the certain values of sensor data are present for that content item, and lower predicted CTR values when the other values of sensor data are present. By way of example, a content item related to reading may have a higher CTR when the sensor data includes values that indicate little or no acceleration for the three axes, the degrees of rotation indicate the device is laying flat, and an object is proximate to the screen of the device (e.g., when a user is reading on the device). In other instances, other content items may have higher CTRs when the sensor data includes values that indicate other ambient conditions (e.g., content items for restaurants, gas stations, hotels, attractions, etc. may have higher CTRs for sensor data that has values indicating a moderate acceleration or deceleration, a vertical orientation, and an object proximate to the screen, such as may occur when a passenger in a vehicle is reading the device). As will be discussed below, such a determined predictive model may be used to output predicted CTR, CVR, or other values for a content item that may be used in the selection and serving of a content item from several content items.

In some instances, the predictive model may be determined for a group or category of content items. For example, the predictive model may be determined based on sets of sensor data and response data associated with a group or category of content items. Such a predictive model may be used to output predicted CTR, CVR, or other values for groups or categories of content items that may be used in the selection of a group or category of content items and, subsequently, to select and serve a content item from several content items of the group or category.

Figure 6:
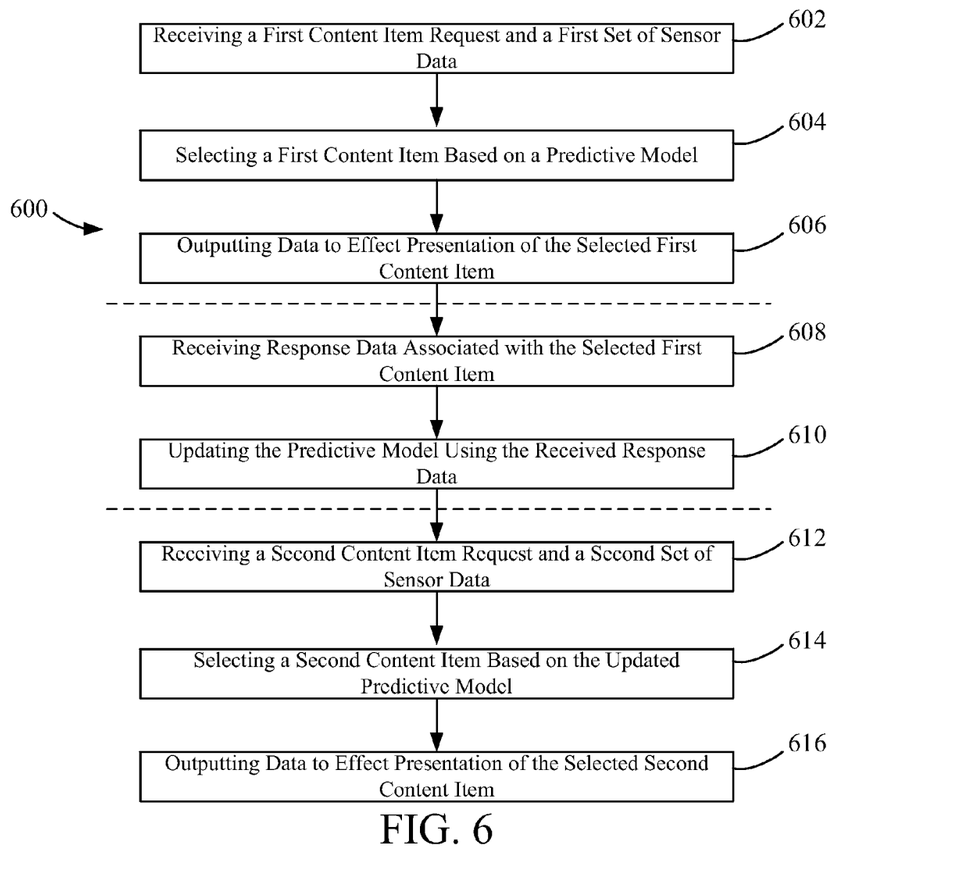
FIG. 6 is a flow diagram of an example method for using and updating a predictive model to select a content item.

FIG. 6 depicts a flow diagram of an example of a method 600 for selecting content items using a predictive model. The method 600 may include receiving a first content item request and a first set of sensor data (block 602). The first content item request may be received by a data processor of a content selection system from a resource server, a user device, a mobile device, and/or otherwise. The first set of sensor data may include several values from respective sensors of a mobile device, such as the sensors of mobile device 200. The several values may identify a first ambient condition of the mobile device. For instance, a high acceleration and high ambient air pressure may identify an ambient condition that occurs when riding the metro or subway. Of course, other values may identify other ambient conditions, such as indicating an ambient condition of a user reading the mobile device when the sensor data includes values that indicate little or no acceleration for the three axes, the degrees of rotation indicate the device is laying flat, and an object is proximate to the screen of the device. Still other values may identify other ambient conditions.

A first content item may be selected based, at least in part, on a predictive model (block 606). The predictive model may output a value, such as a pCTR, pCVR, etc., based on the received first set of sensor data having a first set of values. The predictive model may be determined and/or trained in accordance with method 500 described herein and/or otherwise. In some instances, the predictive model may be selected from several predictive models, such as a predictive model for a specific content item, a group or category of content items, and/or otherwise. For each content item, an output value from the predictive model may be determined. For instance, the output value may be a pCTR value, a pCVR value, and/or other value for the content item based on the received sensor data having a set of values. In some implementations, the content item with the highest output value, as determined by the predictive model, may be selected. In some other implementations, the output values from the predictive model for each content item may be used in further determinations for which content item should be selected (e.g., in an auction of content items, etc.). For example, a content provider may have a higher bid value for a content item for certain values of the sensor data (e.g., those indicating a certain ambient condition) and a lower bid value for other values of the sensor data. Accordingly, the third-party content provider may provide various bid amounts for various values of the sensor data and/or for various identified ambient conditions.

Data to effect presentation of the first selected content item may be outputted (block 608) such that the first selected content item may be presented on a display of the mobile device with a resource, such as a requested mobile webpage and/or a mobile application. In some implementations, the method 600 may end with the presentation of the first selected content item (as noted by the dashed line).

In other implementations, the method 600 may continue to update and/or select a second content item. Response data associated with the selected first content item may be received (block 608). For example, the code transmitted with the selected and served content item may be used to determine whether the served content item is selected, whether a conversion occurs, and/or when any other event is performed. For example, a JavaScript® script may transmit a first value, e.g., a 1, if the served content item is selected by a user of the mobile device and a second value, e.g., a 0, if the served content item is not selected. The script may determine that the content item is not selected if a predetermined period of time elapses without a selection and/or if the content item is no long displayed (e.g., by a user navigating away from a webpage, by terminating the execution of an application, etc.). The script may transmit the response data to the content selection system, such as content selection system 108, by causing a processor of the mobile device to transmit the response data via a network transceiver of the mobile device. The received response data may be associated with the first sensor data and the selected first content item and stored in a database, such as database 310.

The predictive model may be updated using the received response data (block 610). For example, the predictive model may be updated via the determining and/or training of the method 500 described herein and/or otherwise. The received response data may be associated with the first sensor data and combined with a number of historical sensor data sets and historical response data, such as that stored in a database, to be used in updating the predictive model. Accordingly, the predictive model may be updated for subsequent sensor data and response data. The predictive model may be a predictive model for a specific content item, a group or category of content items, and/or otherwise. In some implementations, the method 600 may end with the update of the predictive model (as noted by the dashed line).

In some implementations, the method 600 may continue and include receiving a second content item request and a second set of sensor data (block 612). The second content item request may be received by a data processor of a content selection system from a resource server, a user device, a mobile device, and/or otherwise. The second set of sensor data may include several values from respective sensors of a mobile device, such as the sensors of mobile device 200. In some instances, the mobile device may be the same mobile device from which the first set of sensor data was received or, in other instances, the mobile device may be a different mobile device The several values may identify a second ambient condition of the mobile device. In some instances, the second ambient condition may be the same as the first ambient condition or may be a different ambient condition.

A second content item may be selected based, at least in part, on the updated predictive model (block 614). The updated predictive model may output a value, such as a pCTR, pCVR, etc., based on the received second set of sensor data having a second set of values. For each content item, an output value from the updated predictive model may be determined. In some implementations, the content item with the highest output value, as determined by the updated predictive model, may be selected. In some other implementations, the output values from the updated predictive model for each content item may be used in further determinations for which content item should be selected (e.g., in an auction of content items, etc.). For example, a content provider may have a higher bid value for a content item for certain values of the sensor data (e.g., those indicating a certain ambient condition) and a lower bid value for other values of the sensor data. Accordingly, the third-party content provider may provide various bid amounts for various values of the sensor data and/or for various identified ambient conditions.

Data to effect presentation of the second selected content item may be outputted (block 616) such that the second selected content item may be presented on a display of the mobile device with a resource, such as a requested mobile webpage and/or a mobile application.

Figure 7:
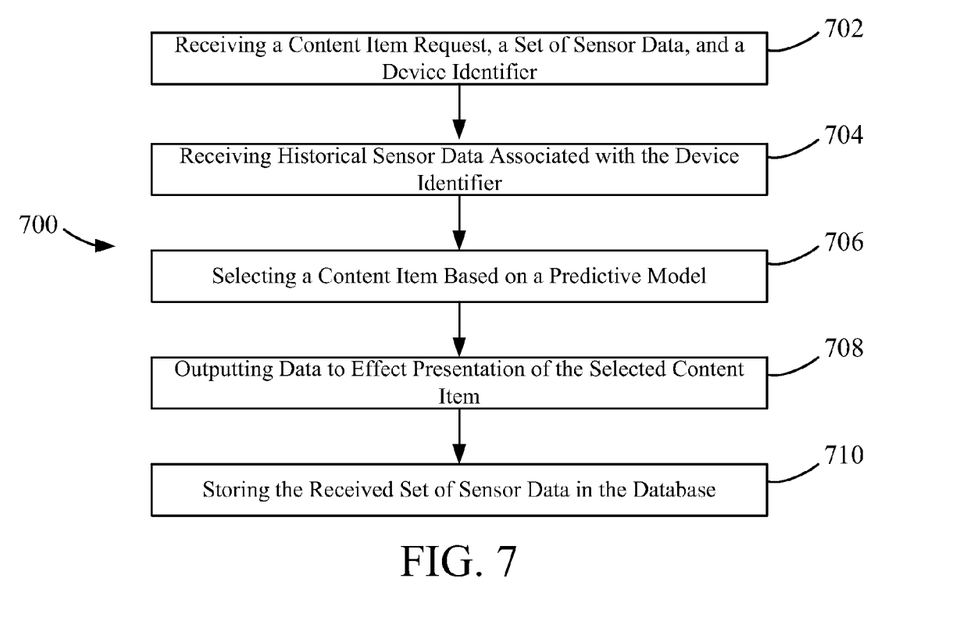
FIG. 7 is a flow diagram of an example method for using a predictive model to select a content item using historical sensor data.

FIG. 7 depicts a flow diagram of an example of a method 700 for selecting a content item using a predictive model and historical sensor data associated with a device identifier. The method 700 may include receiving a content item request, a set of sensor data, and a device identifier (block 702). The content item request may be received by a data processor of a content selection system from a resource server, a user device, a mobile device, and/or otherwise. The set of sensor data may include several values from respective sensors of a mobile device, such as the sensors of mobile device 200. The several values may identify an ambient condition of the mobile device. For instance, a high acceleration and high ambient air pressure may identify an ambient condition that occurs when riding the metro or subway. Of course, other values may identify other ambient conditions. The device identifier may be a randomized number associated with the mobile device to identify the mobile device during subsequent requests for resources and/or content items.

Historical sensor data associated with the received device identifier may be received (block 704). The historical sensor data may be stored and/or received from a device state history associated with the device identifier of a database, such as database 310 of FIG. 3. The historical sensor data of the device state history may be temporarily stored for a predetermined period of time (e.g., sensor data for the past minute, past 5 minutes, past 10 minutes, past 30 minutes, past hours, past 2 hours, past 4 hours, past 6 hours, past 12 hours, past 24 hours, etc.) such that the historical sensor data is erased after a pre-determined period of time (e.g., after 1 minute, 5 minutes, 10 minutes, 30 minutes, 1 hour, 2 hours, 4 hours, 6 hours, 12 hours, 24 hours, etc.). As noted above, the historical sensor data may be periodically received by a content selection system and/or sent by the mobile device and stored in the device state history or otherwise in a database of the content selection system. In some other instances, the historical sensor data may result after storing prior received sensor data from prior received content item requests. Once the predetermined period of time has elapsed, such historical sensor data from the device state history may be deleted, overwritten, and/or otherwise removed from the database such that the historical sensor data for which the predetermined period has elapsed is no longer available. In some instances, the historical sensor data may be stored chronologically, such as in a time series.

A content item may be selected based, at least in part, on a predictive model (block 706). The predictive model may output a value, such as a pCTR, pCVR, etc., based on the received set of sensor data having a set of values and the received historical sensor data having one or more sets of values. The predictive model may be determined and/or trained in accordance with method 500 described herein and/or otherwise. In some instances, the predictive model may be selected from several predictive models, such as a predictive model for a specific content item, a group or category of content items, and/or otherwise. For each content item, an output value from the predictive model may be determined. For instance, the output value may be a pCTR value, a pCVR value, and/or other value for the content item based on the received sensor data having a set of values and the received historical sensor data having one or more sets of values. In some implementations, the content item with the highest output value, as determined by the predictive model, may be selected. In some other implementations, the output values from the predictive model for each content item may be used in further determinations for which content item should be selected (e.g., in an auction of content items, etc.). For example, a content provider may have a higher bid value for a content item for certain values of the sensor data (e.g., those indicating a certain ambient condition) and a lower bid value for other values of the sensor data. Accordingly, the third-party content provider may provide various bid amounts for various values of the sensor data and/or for various identified ambient conditions.

In some instances, the received sensor data and the historical sensor data may be analyzed to determine whether sets of values recur (e.g., indicating a repeating ambient condition, such as riding the metro, jogging, running, etc.). The recurring sets of values may be selected and input into the predictive model. Thus, a content item may be selected based on the recurring sets of values. For example, for sets of sensor data and historical sensor data that indicate a mobile device is used while jogging, the output of the predictive model may be used to select a content item associated with jogging, even if the current sensor data does not have values indicating the ambient condition of jogging.

Data to effect presentation of the selected content item may be outputted (block 708) such that the selected content item may be presented on a display of the mobile device with a resource, such as a requested mobile webpage and/or a mobile application.

Figure 8:
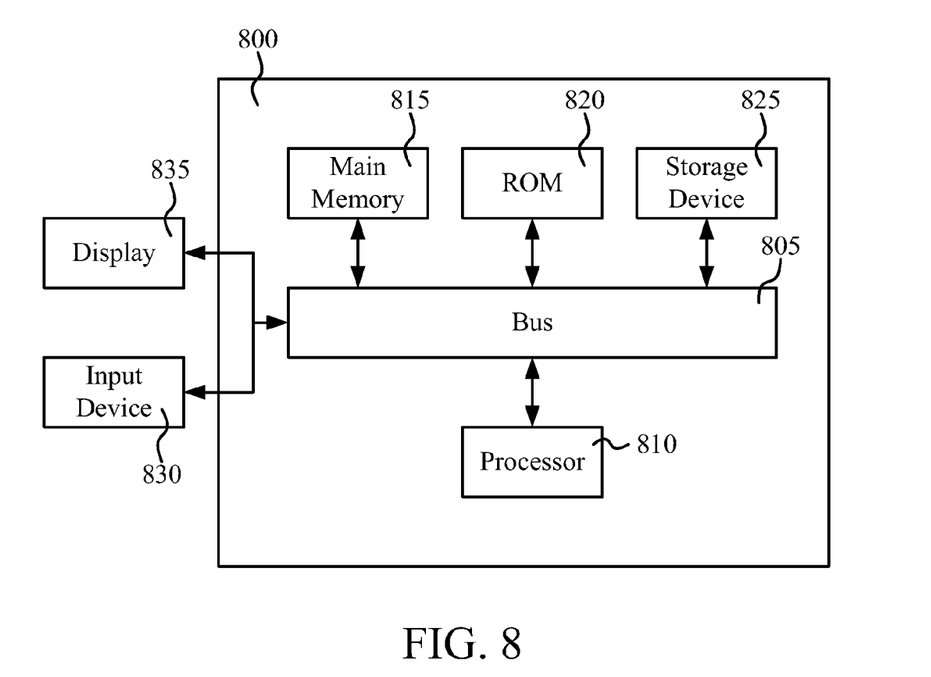
FIG. 8 is a block diagram illustrating a general architecture for a computer system that may be employed to implement various elements of the systems and methods described and illustrated herein.

FIG. 8 is a block diagram of a computer system 800 that can be used to implement the resource server 104, user device 110, content selection system 108, third-party content server 102, etc. The computing system 800 includes a bus 805 or other communication component for communicating information and a processor 810 or processing module coupled to the bus 805 for processing information. The computing system 800 can also include one or more processors 810 or processing modules coupled to the bus for processing information. The computing system 800 also includes main memory 815, such as a RAM or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a ROM 820 or other static storage device coupled to the bus 805 for storing static information and instructions for the processor 810. A storage device 825, such as a solid state device, magnetic disk or optical disk, is coupled to the bus 805 for persistently storing information and instructions. Computing device 800 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 800 may be coupled via the bus 805 to a display 835, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 830, such as a keyboard including alphanumeric and other keys, may be coupled to the bus 805 for communicating information and command selections to the processor 810. In another implementation, the input device 830 may be integrated with the display 835, such as in a touch screen display. The input device 830 can include a cursor control, such as a mouse, a trackball, or cursor direction keys, for communicating direction information and command selections to the processor 810 and for controlling cursor movement on the display 835.

According to various implementations, the processes and/or methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes and/or method steps described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although an example computing system 800 has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular embodiments. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A system comprising:
one or more data processors; and
a storage device storing instructions that, when executed by the one or more data processors, cause the one or more data processors to perform operations comprising:
accessing a set of historical response data associated with a set of content items and a set of historical sensor data associated with the set of historical response data,
generating a predictive model for the set of content items based, at least in part, on the set of historical response data and the set of historical sensor data, wherein the predictive model outputs a value for a content item of the set of content items in response to receiving a set of sensor data from a mobile device, wherein the received set of sensor data from the mobile device is combined with a content item request in a URL string,
selecting a content item based, at least in part, on an output of the predictive model in response to receiving a set of sensor data from a mobile device, and
outputting data to effect presentation of the selected content item.

2. The system of claim 1, wherein set of historical sensor data from one or more mobile devices associated with the set of historical response data is representative of at least one of a device acceleration, a direction of gravity relative to the mobile device, a rate of rotation of the mobile device, a degree of rotation of the mobile device, an ambient geomagnetic field, a proximity of an object relative to the mobile device, an ambient light level, an ambient temperature, an ambient humidity, or an ambient air pressure.

3. The system of claim 1, wherein the set of sensor data from the mobile device is received as part of a content item request from a mobile webpage.

4. The system of claim 1, wherein the set of sensor data from the mobile device is received as part of a content item request from an application executed on the mobile device.

5. A computer-readable storage device storing instructions that, when executed by one or more data processors, cause the one or more data processors to perform operations comprising:
receiving, from a mobile device, a content item request, a set of sensor data, and a device identifier;
receiving, from a database, a set of historical sensor data associated with the device identifier, wherein the set of historical sensor data is erased after a pre-determined period of time, wherein the pre-determined period of time is less than 24 hours;
selecting a content item based, at least in part, on a predictive model, wherein the predictive model outputs a value based on the received set of sensor data and the received set of historical sensor data; and
outputting, in response to the content item request, data to effect presentation of the selected content item with a resource associated with the content item request.

6. The computer-readable storage device of claim 5, wherein the resource is a mobile webpage.

7. The computer-readable storage device of claim 5, wherein the resource is a mobile application executing on the mobile device.

8. The computer-readable storage device of claim 5, wherein the pre-determined period of time is less than 1 hour.

* * * * *